United States Patent
Kim et al.

(10) Patent No.: US 11,049,104 B2
(45) Date of Patent: Jun. 29, 2021

(54) METHOD OF PROCESSING PAYMENT BASED ON BLOCKCHAIN AND APPARATUS THEREOF

(71) Applicant: SAMSUNG SDS CO., LTD., Seoul (KR)

(72) Inventors: Young Kwon Kim, Seoul (KR); Se Hyung Kim, Seoul (KR); Ji Hwan Rhie, Seoul (KR); Young Ju Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 446 days.

(21) Appl. No.: 15/934,384

(22) Filed: Mar. 23, 2018

(65) Prior Publication Data

US 2018/0293577 A1    Oct. 11, 2018

(30) Foreign Application Priority Data

Apr. 5, 2017   (KR) .................. 10-2017-0044429
Sep. 25, 2017  (KR) .................. 10-2017-0123561

(51) Int. Cl.
   *G06Q 20/40*    (2012.01)
   *G06Q 20/36*    (2012.01)
   (Continued)

(52) U.S. Cl.
   CPC ........... *G06Q 20/401* (2013.01); *G06F 3/017* (2013.01); *G06Q 20/06* (2013.01); *G06Q 20/36* (2013.01);
   (Continued)

(58) Field of Classification Search
   CPC ............. G06Q 20/401; G06Q 2220/00; G06Q 20/403; G06Q 20/36; G06Q 20/3825;
   (Continued)

(56) References Cited

U.S. PATENT DOCUMENTS 8,433,914 B1 *   4/2013   Philpott ............... H04L 9/3247
                                                       713/180
10,057,061 B1 *  8/2018   Maeng ................. H04L 63/126
(Continued)

FOREIGN PATENT DOCUMENTS

KR       10-1784219 B1      10/2017

OTHER PUBLICATIONS

L. Van Der Horst, K. R. Choo and N. Le-Khac, "Process Memory Investigation of the Bitcoin Clients Electrum and Bitcoin Core," in IEEE Access, vol. 5, pp. 22385-22398, 2017, doi: 10.1109/ACCESS. 2017.2759766 (Year: 2017).*

*Primary Examiner* — Mamon Obeid
*Assistant Examiner* — Jahed Ali
(74) *Attorney, Agent, or Firm* — Sughrue Mion, PLLC

(57) ABSTRACT

Provided are a method of processing payment based on a blockchain, which is performed by a payment service providing server. The method comprising receiving a request from a terminal of a seller for an electronic wallet address of a payer, the request comprising identification information of the payer, obtaining the electronic wallet address of the payer based on the identification information of the payer through a blockchain system, in response to the receiving the request for the electronic wallet address, transmitting the obtained electronic wallet address of the payer to the terminal of the seller, receiving payment request information from the terminal of the seller, the payment request information comprising the obtained electronic wallet address of the payer, transmitting the payment request information to a terminal of the payer, receiving payment information from the terminal of the payer, the payment information comprising the payment request information and an electronic signature of the payer and processing a payment transaction based on the payment information through the blockchain (Continued)

system in response to the receiving the payment information.

18 Claims, 12 Drawing Sheets

(51) Int. Cl.
| | |
|---|---|
| *G06Q 20/38* | (2012.01) |
| *G06F 3/01* | (2006.01) |
| *H04L 9/06* | (2006.01) |
| *G06Q 20/06* | (2012.01) |
| *H04W 4/24* | (2018.01) |
| *H04M 15/00* | (2006.01) |
| *H04L 12/14* | (2006.01) |
| *H04L 29/08* | (2006.01) |
| *H04L 9/32* | (2006.01) |
| *H04W 4/80* | (2018.01) |

(52) U.S. Cl.
CPC ....... *G06Q 20/3825* (2013.01); *G06Q 20/403* (2013.01); *H04L 9/0637* (2013.01); *H04L 9/3236* (2013.01); *H04L 12/14* (2013.01); *H04L 67/00* (2013.01); *H04L 67/12* (2013.01); *H04M 15/00* (2013.01); *H04W 4/24* (2013.01); *G06Q 2220/00* (2013.01); *H04L 67/104* (2013.01); *H04L 2209/38* (2013.01); *H04L 2209/56* (2013.01); *H04W 4/80* (2018.02)

(58) Field of Classification Search
CPC ........ G06Q 20/06; H04M 15/00; G06F 3/017; H04W 4/80; H04W 4/24; H04L 67/104; H04L 12/14; H04L 67/00; H04L 9/3236; H04L 67/12; H04L 9/0637; H04L 2209/56; H04L 2209/38
See application file for complete search history.

(56) References Cited

U.S. PATENT DOCUMENTS

| | | | |
|---|---|---|---|
| 10,719,816 B1* | 7/2020 | Kurani | G06Q 40/04 |
| 2009/0254440 A1* | 10/2009 | Pharris | G06Q 20/105 |
| | | | 705/17 |
| 2011/0189981 A1* | 8/2011 | Faith | G06Q 20/40 |
| | | | 455/414.1 |
| 2012/0330787 A1* | 12/2012 | Hanson | G06Q 30/00 |
| | | | 705/26.41 |
| 2013/0024379 A1* | 1/2013 | Di Tucci | G06Q 20/32 |
| | | | 705/44 |
| 2014/0074635 A1* | 3/2014 | Reese | G06Q 20/401 |
| | | | 705/21 |
| 2015/0026072 A1* | 1/2015 | Zhou | G06Q 20/20 |
| | | | 705/71 |
| 2016/0203475 A1* | 7/2016 | Venugopalan | G06Q 20/3672 |
| | | | 705/66 |
| 2017/0017955 A1* | 1/2017 | Stern | H04W 4/02 |
| 2017/0053249 A1* | 2/2017 | Tunnell | G06Q 20/065 |
| 2018/0018660 A1* | 1/2018 | Gomes | H04W 12/06 |
| 2018/0025342 A1* | 1/2018 | Shauh | G06Q 20/4012 |
| | | | 705/44 |
| 2018/0101906 A1* | 4/2018 | McDonald | G06Q 20/204 |
| 2018/0189781 A1* | 7/2018 | McCann | G06Q 20/202 |
| 2018/0204192 A1* | 7/2018 | Whaley | G06Q 20/0658 |
| 2018/0302222 A1* | 10/2018 | Agrawal | H04W 4/70 |
| 2020/0193425 A1* | 6/2020 | Ferenczi | G06Q 20/3829 |

* cited by examiner

METHOD OF PROCESSING PAYMENT BASED ON BLOCKCHAIN AND APPARATUS THEREOF

This application claims priority from Korean Patent Application No. 10-2017-0044429 filed on Apr. 5, 2017 and No. 10-2017-0123561 filed on Sep. 25, 2017 in the Korean Intellectual Property Office, the disclosure of which is incorporated herein by reference in its entirety.

BACKGROUND

1. Field of the Disclosure

The present disclosure relates to a method of processing payment based on a blockchain and an apparatus thereof, and more particularly, to a blockchain-based payment processing method for improving user convenience in providing a payment service based on an electronic currency issued through a blockchain, and an apparatus for implementing the same.

2. Description of the Related Art

A blockchain refers to data management technology, in which continuously growing data is recorded in certain units of block and nodes of a peer-to-peer (P2P) network managing the blocks in a chain-form data structure, or refers to data itself of the chain-form data structure. In this case, blockchain data of the chain-form data structure is managed in the form of a distributed ledger at each individual node, without a central system.

Each individual blockchain node of a blockchain network or a blockchain system manages blocks in a data structure such as that shown in FIG. 1. Here, each block is recorded with a hash value of a previous block, so that the previous block can be referred to by the hash value. Therefore, as more blocks are added, it becomes difficult to forge transaction data recorded in the block, and the transaction data recorded in each block is improved in reliability.

The transaction requested to the blockchain system is, for example, processed by the procedure shown in FIG. 2. Referring to FIG. 2, when a transaction processing request is received from a payer terminal of an electronic currency (①), validity verification for a transaction is performed to prevent double spending or the like (②), and transaction data is transmitted to a block mining node in the case of a valid transaction (③). Next, the block mining node records the transaction data in a new block (④), and the new block is spread over the blockchain network to achieve a distributed consensus (⑤). When the transaction is finally confirmed by the distributed consensus, a predetermined electronic currency is transferred from an electronic wallet of a payer to an electronic wallet of a payee (⑥).

With the foregoing procedure, the blockchain system has advantages of providing a safe transaction service between parties concerned with the transaction without a central management system. However, when the payment service is provided by the blockchain system, a payer who makes a purchase of goods or services has to be a main agent of generating the transaction, and a problem of low user convenience may arise.

Such a problem is caused by characteristics of the transaction processed by the blockchain. All the transactions on the blockchain are of a sending type transaction in which a payer gives a payee an electronic currency. Therefore, the payer who uses the blockchain-based payment service has no choice but to undergo a payment procedure of, instead of approving the payment, directly making a request for a payment transaction. As a specific example, as shown in FIG. 3, a payer has to input an electronic wallet address of a seller to a first graphic user interface (GUI) 11 of an electronic wallet application, input a payment amount to a second GUI 13, and make a request for a payment transaction through a third GUI 15.

This is very inconvenient for a user when compared with a conventional method in which a seller makes a request for a payment transaction and a payer needs only to approve of payment. In particular, a user who is used to the conventional method may be displeased with the blockchain system, and there is a limit to a range of use of the blockchain-based payment service As a way of solving the problem of low user convenience, there has been proposed a method of obtaining the electronic wallet address of the seller by scanning a quick response (QR) code. However, even in this proposed method, the payer has to directly perform a series of activities such as scanning the QR code, inputting the payment amount, making a request for the payment transaction, etc., and thus the problem of low user convenience is not yet solved.

SUMMARY

Aspects of the present disclosure provide a blockchain-based payment processing method for improving user convenience in providing a payment service based on an electronic currency issued through a blockchain, and an apparatus for implementing the same.

It should be noted that objects of the present disclosure are not limited to the above-described objects, and other objects of the present disclosure will be apparent to those skilled in the art from the following descriptions.

According to an aspect of the disclosure, there is provided a method of processing payment based on a blockchain, which is performed by a payment service providing server. The method comprises receiving a request from a terminal of a seller for an electronic wallet address of a payer, the request comprising identification information of the payer, obtaining the electronic wallet address of the payer based on the identification information of the payer through a blockchain system, in response to the receiving the request for the electronic wallet address, transmitting the obtained electronic wallet address of the payer to the terminal of the seller, receiving payment request information from the terminal of the seller, the payment request information comprising the obtained electronic wallet address of the payer, transmitting the payment request information to a terminal of the payer, receiving payment information from the terminal of the payer, the payment information comprising the payment request information and an electronic signature of the payer and processing a payment transaction based on the payment information through the blockchain system in response to the receiving the payment.

According to another aspect of the disclosure, there is provided a server for providing a payment service. The server comprises a hardware processor and a memory configured to load a computer program executed by the hardware processor, wherein the computer program which, when executed by the hardware processor, causes the hardware processor to perform operations comprising receiving a request from a terminal of a seller for an electronic wallet address of a payer, the request comprising identification information of the payer, obtaining the electronic wallet address of the payer based on the identification information of the payer through a blockchain system, in response to the receiving the request for the electronic wallet address, transmitting the obtained electronic wallet address of the payer to the terminal of the seller, receiving payment request information from the terminal of the seller, the payment request information comprising the obtained electronic wallet address of the payer from the terminal of the seller, transmitting the payment request information to a terminal of the payer, receiving payment information from the terminal of the payer, the payment information comprising the payment request information and an electronic signature of the payer and processing a payment transaction based on the payment information through the blockchain system in response to the receiving the payment information.

According to another aspect of the disclosure, there is provided a non-transitory computer-readable storage medium storing a computer program which, when executed by a computing apparatus, causes the computing apparatus to perform operations comprising receiving a request from a terminal of a seller for an electronic wallet address of a payer, the request comprising identification information of the payer, obtaining the electronic wallet address of the payer based on the identification information of the payer through a blockchain system, in response to the receiving the request for the electronic wallet address, transmitting the obtained electronic wallet address of the payer to the terminal of the seller, receiving payment request information from the terminal of the seller, the payment request information comprising the obtained electronic wallet address of the payer from the terminal of the seller, transmitting the payment request information to a terminal of the payer.

According to another aspect of the disclosure, there is provided a server for providing a payment service, the server comprising: a hardware processor; and a memory configured to load a computer program executed by the hardware processor; wherein the computer program which, when executed by the hardware processor, causes the hardware processor to perform operations comprising: receiving a first payment request information from a first terminal of a first user, the first payment request information comprising an electronic wallet address of a second user in a blockchain system; generating a second payment request information based on the first payment request information; transmitting the second payment request information to a second terminal of the second user; receiving payment information from the second terminal of the second user, the payment information comprising an electronic signature of the second user; and processing a payment transaction based on the payment information through the blockchain system in response to the receiving the payment information.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Prior to the description of this specification, some terms used in this specification will be defined.

Figure 1:
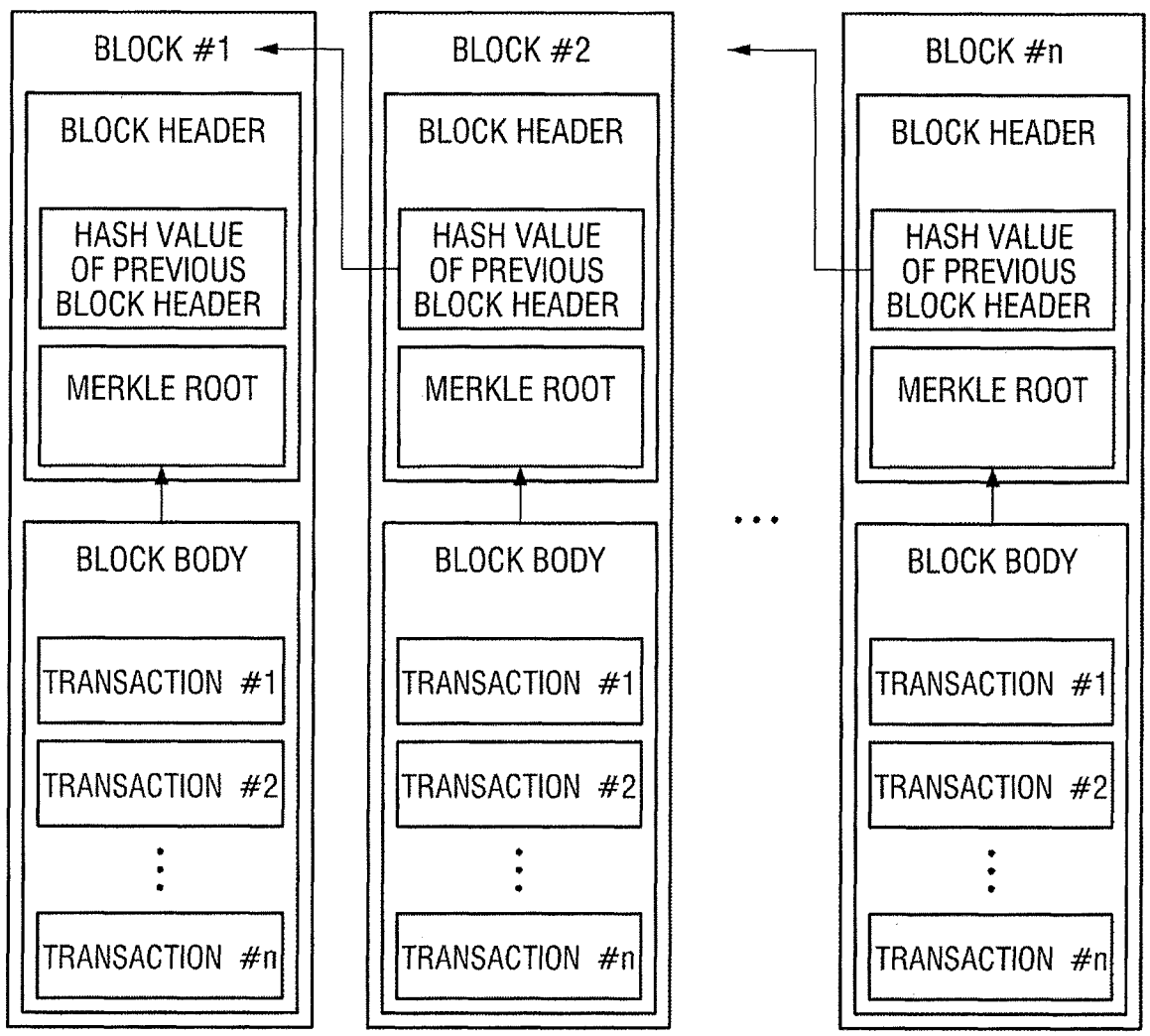
FIG. 1 is a view for describing a structure of blockchain data to be referred to in some exemplary embodiments of the present disclosure.
Figure 2:
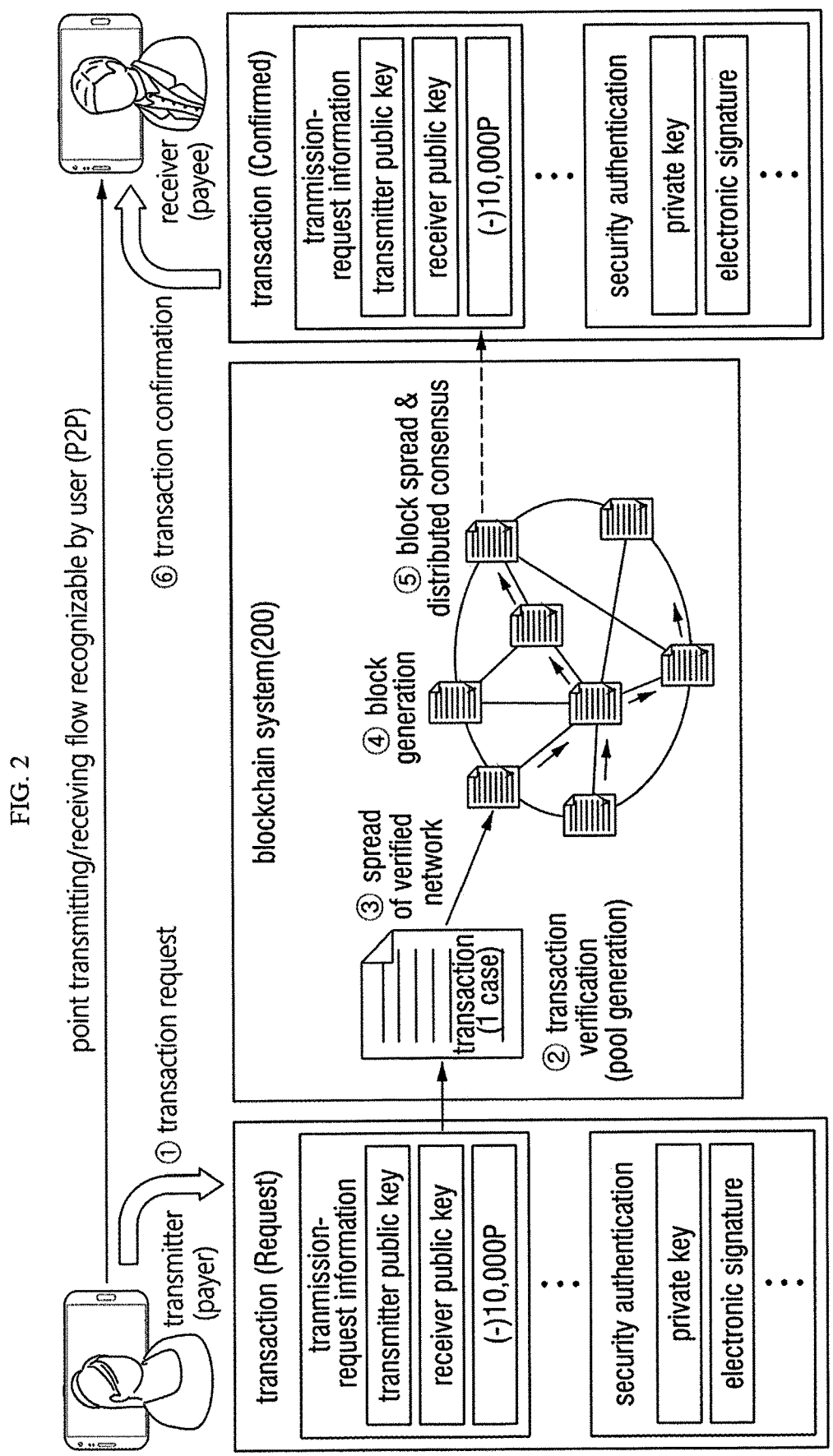
FIG. 2 is a view for describing a transaction processing procedure performed in a conventional blockchain system.
Figure 3:
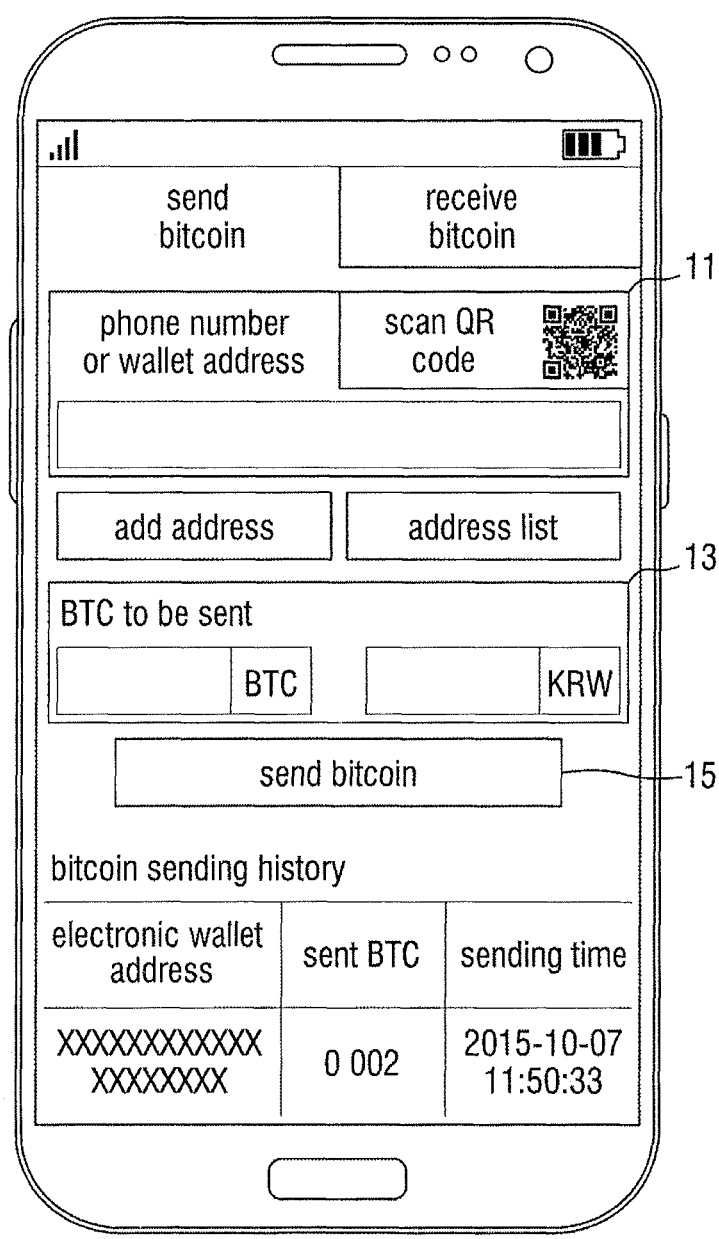
FIG. 3 is a view for describing a conventional method of providing a blockchain-based payment service.

In this specification, blockchain data refers to data in which each individual blockchain node of a blockchain network is maintained, and indicates data in which at least one block is configured in a chain-form data structure. When data recorded in each individual block is transaction data, the blockchain data may be used as a distributed ledger. However, the kind of data to be recorded in each individual block may be varied as desired. The structure of the blockchain data is shown in FIG. 1.

In this specification, the blockchain network refers to a network of a peer-to-peer (P2P) structure having a plurality of blockchain nodes that operates in accordance with a blockchain algorithm.

In this specification, the blockchain node refers to that which forms the blockchain network and maintains and manages blockchain data on the basis of a blockchain algorithm. The blockchain node may be materialized as a single computing device, but may also be achieved using a virtual machine or the like. When the virtual machine is used as the blockchain node, a plurality of nodes may be present in the single computing device.

In this specification, a block mining node refers to a node for mining new blocks through mining among the blockchain nodes of the blockchain network.

In this specification, a virtual currency in a broad sense refers to an electronic currency to be transacted in cyberspace without real objects. In a narrow sense, the virtual currency refers to an electronic currency issued through mining in the blockchain, like bitcoins for example, and may be used along with the term 'native asset' or the like in the art.

In this specification, a user-defined currency refers to a currency defined by a user and based on the virtual currency. For example, the user-defined currency may be a currency defined by a transaction service operator through the open asset protocol. For reference, the term "currency" in the virtual currency and/or the user-defined currency may be used to have a comprehensive meaning, including an asset to be transacted as well as a currency to be used as a means of exchange. For example, the user-defined currency may include a financial asset such as a stock, a bond, etc. as well as a commodity currency, a point-type currency such as points, mileage, etc. The user-defined currency may be used along with the term 'custom asset' or the like in the art.

In this specification, the open asset protocol refers to the asset issuance technology of issuing the user-defined currency based on the virtual currency in the blockchain. The open asset protocol may be used along with the term 'colored coin' or the like in the art.

In this specification, permission may be understood as a comprehensive concept including authentication and authorization.

Below, some exemplary embodiments of the present disclosure will be described in detail with reference to the accompanying drawings.

Figure 4:
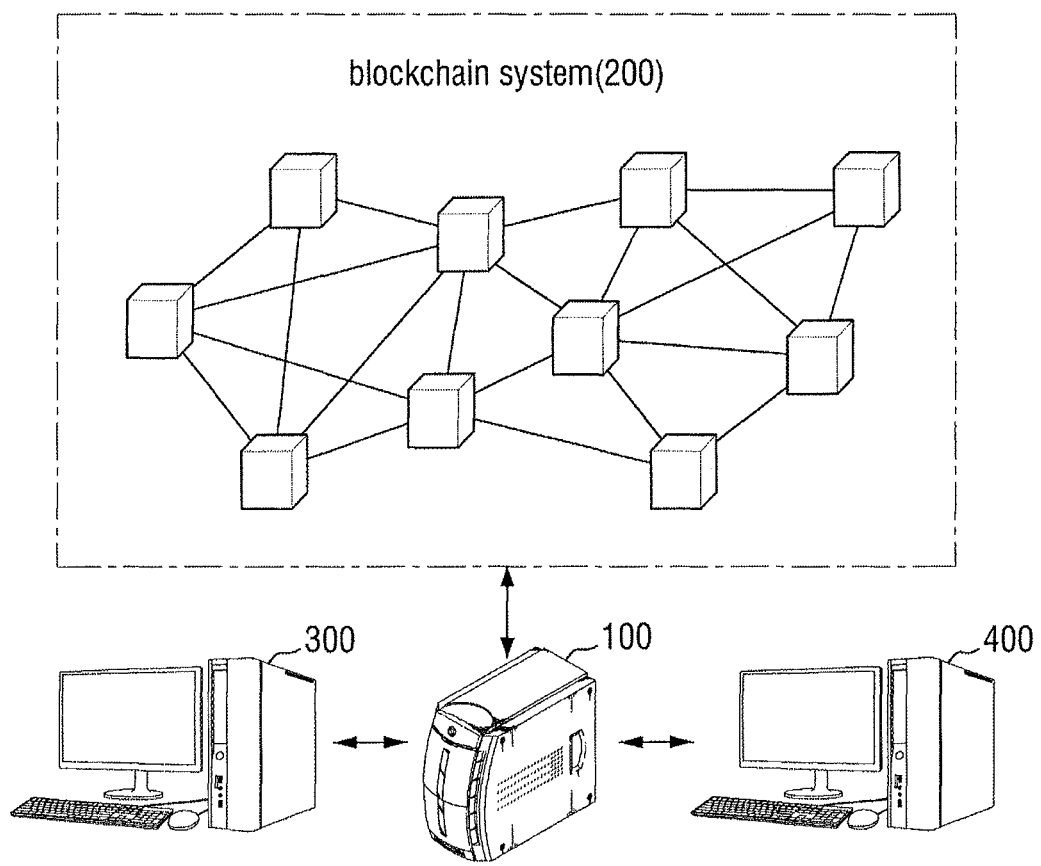
FIG. 4 is a configuration view of a blockchain-based payment processing system according to one embodiment of the present disclosure.

FIG. 4 is a view of a blockchain-based payment processing system according to one exemplary embodiment of the present disclosure.

The blockchain-based payment processing system refers to a system for providing a payment service based on electronic currency issued on a blockchain. Here, the electronic currency may include a virtual currency issued by a blockchain algorithm or a user-defined currency defined based on the virtual currency. Below, configurations and operations of the blockchain-based payment processing system according to the embodiment of the present disclosure will be described with reference to FIG. 4.

Referring to FIG. 4, the blockchain-based payment processing system may be configured to include a payment-service providing server 100, a blockchain system 200, a payer terminal 300, and a seller terminal 400. However, this is merely an exemplary embodiment for achieving an object of the present disclosure, and some elements may be added or removed as necessary. Further, the elements of the blockchain-based payment processing system shown in FIG. 4 indicate functional elements that are classified by function, and it will be appreciated that at least one element may be given in combination form in a real physical environment. For example, the payment-service providing server 100 may also be materialized as one blockchain node in the establishment of the blockchain system 200. Below, the elements of the blockchain-based payment processing system will be described.

In the blockchain-based payment processing system, the payment-service providing server 100 is a computing device that provides a blockchain-based payment service. Here, the computing device may include a notebook computer, a desktop computer, a laptop computer, etc. without limitation, and may include any kind of device including an operating unit and a communicating unit.

The payment service providing server 100 executes control so that the payment transaction is processed through the blockchain system 200 in response to a request for processing the payment transaction.

According to one exemplary embodiment of the present disclosure, the payment service providing server 100 obtains an electronic wallet address of a payer through the blockchain system 200, and transmits the obtained electronic wallet address to the seller terminal 400. That is, the payment service providing server 100 provides the electronic wallet address of the payer as one piece of essential information for the payment transaction to the seller terminal 400. Since the electronic wallet address and the payment amount of the seller are information to be input by the seller, the seller terminal 400 in this embodiment may collect all pieces (①the electronic wallet address of the payer, ②the electronic wallet address of the seller, and ③the payment amount) of the essential information for the payment transaction. Therefore, the seller terminal 400 transmits payment request information including the essential information to the payer terminal 300 and makes a request for payment, thereby acting as a trigger point of the payment transaction. According to the exemplary embodiment, the payer can be provided with the blockchain-based payment service by just approving the payment, without directly inputting payment information. Therefore, user convenience is greatly improved. Details of this exemplary embodiment will be described with reference to FIGS. 8 to 11.

In the blockchain-based payment processing system, the blockchain system 200 refers to a system for processing various transactions based on the blockchain. Specifically, the blockchain system 200 includes a blockchain network established with a plurality of blockchain nodes, and the blockchain nodes established in the blockchain network perform mining, spreading, verifying, recording, and like operations based on the blockchain algorithm. Each individual blockchain node keeps the same blockchain data, and processes the payment transaction in response to the request from the payment service providing server 100. Details of a method of processing the payment transaction in the blockchain system 200 will be described with reference to FIG. 12.

According to one embodiment of the present disclosure, the blockchain network established with the plurality of blockchain nodes may be a permission-based blockchain network. That is, the blockchain network may be a network established by participation of only permitted blockchain nodes. Here, the permission-based blockchain network may be used along with the term 'private blockchain network' or the like in the art, which may have the same meaning. According to the exemplary embodiment, since participation of unspecified nodes is not included, there is no need for excessive proof of operation required in mining the blocks, and it is possible to provide a safer payment service.

In the exemplary embodiment, permission verification may be performed with regard to each of a user domain of a blockchain application, a blockchain node domain, and a block mining node domain to establish a blockchain network based on permission. Below, the permission verification method performed in each domain will be described in brief.

In the case of the user domain of the blockchain application, authentication and/or authorization management may be performed with regard to a service user. For example, access control is performed using an access control list (ACL) in an application program interface (API), or a user's electronic signature used in a transaction request is employed, thereby performing the permission verification with regard to the user.

In the case of the blockchain node domain, permission verification may be performed using permission information (e.g., permission information recorded in a configuration file) previously stored in each blockchain node at a time point when each blockchain node becomes activated to participate in the blockchain network. Here, the permission information may be periodically updated or controlled by a central management device according to exemplary embodiments. Further, permission verification between the nodes may be performed in a stage in which each blockchain node sets up P2P communication with another blockchain node. In this case, the permission verification between the nodes may be performed using, for example, permission information stored in blockchain data (e.g., a whitelist including permitted blockchain node information, etc.). When the permission information is stored in the blockchain data, it is possible to prevent the permission information from being forged or altered. The permission information may also be information set by the central management device.

In the case of the block mining node domain, permission verification may be performed with regard to a new block. For example, each individual blockchain node may operate to add only a new block, which is mined by the permitted block mining node, to blockchain data. In this case, the verification of the permission may be performed by the same method as the verification of the blockchain node domain. Alternatively, when each individual block mining node operates to record its own electronic signature in a new block, other blockchain nodes verify the electronic signature recorded in the new block, thereby performing the permission verification with regard to the new block.

For reference, the reliability of the blockchain system 200 is largely influenced by whether the block mining node is well-intentioned, and therefore a second permission, i.e., a permission verification reference for the block mining node, is set to be higher than a first permission as a permission verification reference for the blockchain node. That is, the blockchain system 200 may operate to make only the reliable nodes corresponding to a higher permission be used as block mining nodes.

According to one exemplary embodiment of the present disclosure, the blockchain system 200 is established using a permission-based blockchain network, and operates to instantly process a transaction. That is, the blockchain system 200 may operate such that the electronic currency may be transferred to the electronic wallet of the seller in accordance with the payment transaction before the payment transaction is recorded in a new block, on the basis of mutual reliability, and the payer terminal 300 and the seller terminal 400 can be notified of transaction processing completion. According to the exemplary embodiment, the payment transaction is processable at high speed, thereby improving satisfaction of a user using the payment service. Hereinafter, a transaction to be processed instantly will be referred to as an "instant transaction," and detailed descriptions of the exemplary embodiment will be made below with reference to FIG. 13.

In the blockchain-based payment processing system, the payer terminal 300 refers to a terminal used by a payer and provided with the blockchain-based payment service. For example, the payer may pay in electronic currency for items (e.g., goods, services, etc.) purchased from the seller using the electronic wallet application installed in the payer terminal 300.

According to one exemplary embodiment of the present disclosure, the payer terminal 300 may provide various functions to improve convenience in a payment procedure. For example, the payer terminal 300 may provide a push notification with a deep link in response to various received requests. Alternatively, the payer terminal 300 may operate to recognize a payer's gesture and make an electronic signature without a user's direct input. Additionally, the payer terminal 300 may provide various functions for improving convenience, and detailed descriptions thereof will be made below with reference to FIGS. 8 to 10.

In the blockchain-based payment processing system, the seller terminal 400 refers to a terminal used by a seller and provided with a blockchain-based payment service.

According to one exemplary embodiment of the present disclosure, the seller terminal 400 may receive an electronic wallet address of a payer from the payment service providing server 100, and generate and provide the payment request information to the payer terminal 300. That is, the seller terminal 400 may become a trigger point of a payment transaction, and thus improve payer convenience. Details of this embodiment will also be described below with reference to FIG. 8.

In the blockchain-based payment processing system, the elements may communicate with each other through a network. Here, the network may be achieved by all kinds of wired/wireless networks such as a local area network (LAN), a wide area network (WAN), a mobile radio communication network, wireless broadband Internet (WiBro), etc.

The blockchain-based payment processing system according to one exemplary embodiment of the present disclosure has been hitherto described with reference to FIG. 4. Next, elements in the blockchain-based payment processing system will be described with reference to FIGS. 5 to 7.

Figure 5:
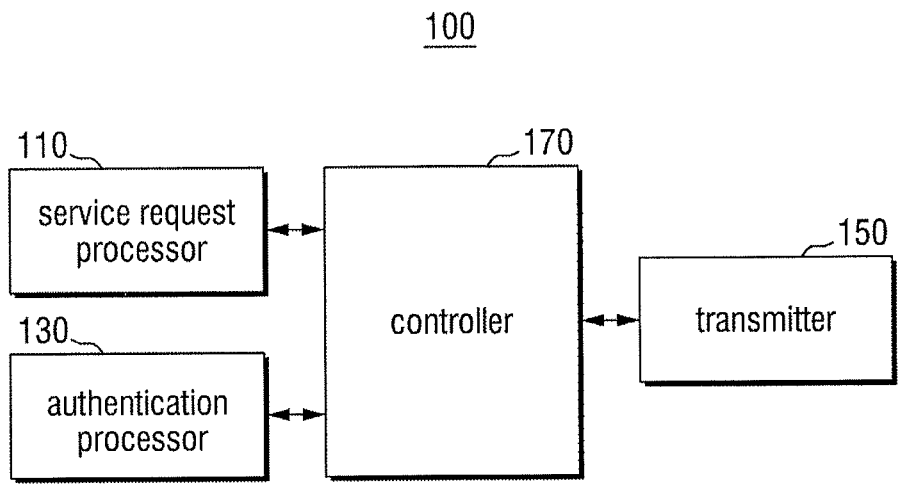
FIG. 5 is a block diagram of a payment service providing server (100) as one element of the blockchain-based payment processing system shown in FIG. 1.

FIG. 5 is a block diagram of a payment-service providing server 100 as one element of the blockchain-based payment processing system.

Referring to FIG. 5, the payment-service providing server 100 may include a service request processor 110, an authentication processor 130, a communicator 150, and a controller 170. For reference, FIG. 5 shows only elements related to the exemplary embodiment of the present disclosure. Therefore, those skilled in the art to which the present disclosure pertains will understand that other general-purpose elements may be provided in addition to the elements shown in FIG.

5. Further, the elements of the payment-service providing server shown in FIG. 5 indicate functional elements that are classified by function, and it will be appreciated that at least one element may be given in combination form in a real physical environment.

The elements are as follows. The service request processor 110 receives various requests between the payer terminal 300 and the seller terminal 400, and provides results in accordance with the requests. For example, the service request processor 110 makes the blockchain system 200 process the payment transaction in response to the processing request for the payment transaction. Details of the service request processor 110 will be described with reference to FIG. 8.

The authentication processor 130 performs general functions related to authentication of a user who uses the payment service. For example, the authentication processor 130 may authenticate a service user so that only members of the payment service are provided with the blockchain-based payment service.

The communicator 150 performs data communication with other elements of the blockchain-based payment system. To this end, the communicator 150 may include a wired Internet module, a mobile communication module, or a wireless communication module to exchange data with the computing device as described above.

The controller 170 controls general operations of the elements of the payment-service providing server 100. The controller 170 may be configured to include a central processing unit (CPU), a microprocessor unit (MPU), a microcontroller unit (MCU), or any processor well-known in the technical field of the present disclosure. Further, the controller 170 may perform an operation for at least one application or program to implement the method according to the foregoing exemplary embodiments of the present disclosure.

The elements of FIG. 5 may mean software, or mean hardware such as a field programmable gate array (FPGA) or an application-specific integrated circuit (ASIC). However, the elements are not limited to software or hardware, but may be configured to be in a storage medium capable of addressing or running one or more processors. The functions provided in the foregoing elements may be achieved with more subdivided elements, and may be achieved by one element in which a plurality of elements are combined to perform a specific function.

Figure 6:
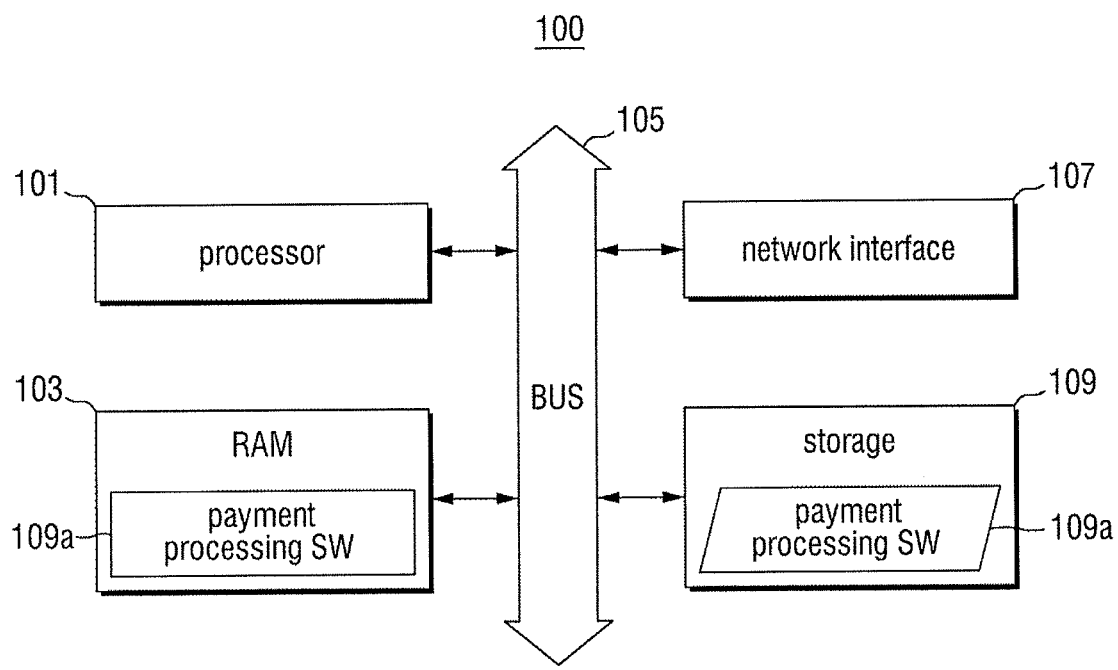
FIG. 6 is a hardware configuration view of the payment service providing server (100) as one element of the blockchain-based payment processing system shown in FIG. 1.

Next, FIG. 6 shows a hardware configuration view of the payment service providing server 100.

Referring to FIG. 6, the payment service providing server 100 may include one or more processors 101, a bus 105, a network interface 107, a memory 103 from which a computer program to be executed by the processor 101 is loaded, and a storage 109 for storing blockchain-based payment software 109a. However, FIG. 6 shows only the elements related to the exemplary embodiment of the present disclosure. Therefore, those skilled in the art to which the present disclosure pertains will understand that other general-purpose elements may be provided in addition to the elements shown in FIG. 6.

The processor 101 controls general operations of the elements of the payment service providing server 100. The processor 101 may be configured to include a CPU, an MPU, an MCU, a graphic processing unit (GPU), or any processor well-known in the technical field of the present disclosure. Further, the processor 101 may perform an operation for at least one application or program to implement the method according to the foregoing exemplary embodiments of the present disclosure. The payment service providing server 100 may include one or more processors.

The memory 103 stores various pieces of data, commands and/or information. The memory 103 may load one or more programs 109a from the storage 109 to implement the blockchain-based payment processing method according to exemplary embodiments of the present disclosure. FIG. 6 shows a read only memory (RAM) as an example of the memory 103.

The bus 105 provides a communication function between the elements of the payment service providing server 100. The bus 105 may be variously materialized as an address bus, a data bus, a control bus, etc.

The network interface 107 supports wired/wireless Internet communication of the payment service providing server 100. Additionally, the network interface 107 may support various communication types in addition to Internet communication. To this end, the network interface 107 may include a communication module well-known in the technical field of the present disclosure.

The storage 109 may temporarily store one or more programs 109a described above. FIG. 6 shows blockchain-based payment processing software 109a as an example of one or more programs 109a.

The storage 109 may include a nonvolatile memory such as a read only memory (ROM), an erasable programmable ROM (EPROM), an electrically erasable programmable ROM (EEPROM), a flash memory, etc., a hard disk drive, a detachable disk drive, or any computer-readable recording medium well-known in the technical field of the present disclosure.

The blockchain-based payment processing software 109a may implement the blockchain-based payment processing method according to an exemplary embodiment of the present disclosure.

Specifically, the blockchain-based payment processing software 109a is loaded from the memory 103, and employs one or more processors 101 to implement an operation of obtaining the electronic wallet address of the payer though the blockchain system using identification information in response to the identification information of a payer received from the seller terminal 400; an operation of transmitting the electronic wallet address of the payer to the seller terminal 400; an operation of generating payment information to be processed through the blockchain system 200 based on payment request information in response to the payment request information received from the seller terminal 400, in which the payment request information includes the electronic wallet address of the seller, the electronic wallet address of the payer, and the payment amount; and an operation of processing the payment transaction based on the payment information through the blockchain system 200.

The configurations and operations of the payment service providing server 100 have been hitherto described with reference to FIGS. 5 and 6. Next, a configuration and operation of the payer terminal 300 will be described with reference to FIG. 7.

Figure 7:
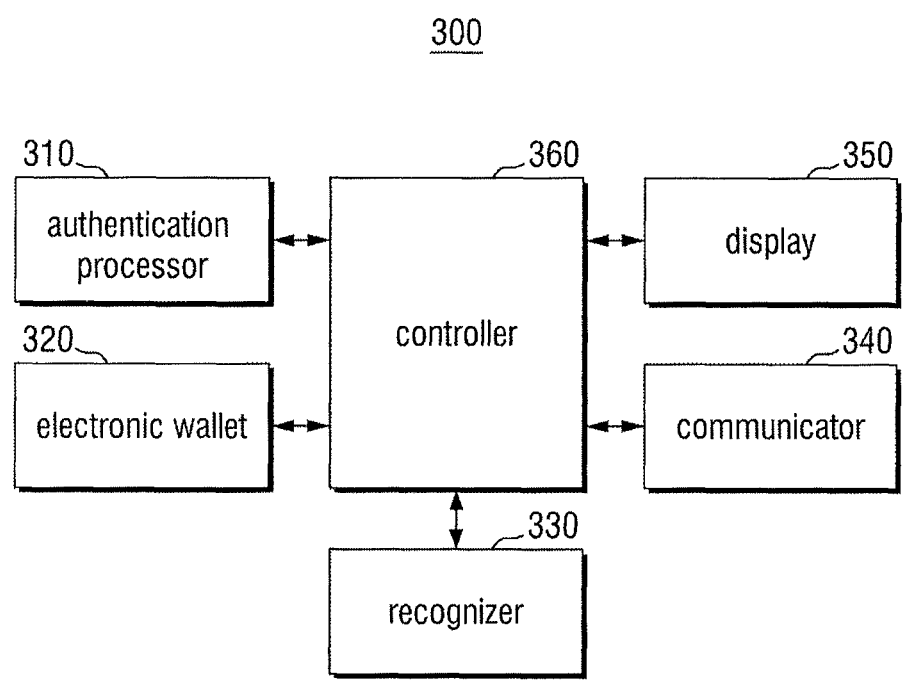
FIG. 7 is a block diagram of a payer terminal (300) as one element of the blockchain-based payment processing system shown in FIG. 1.

Referring to FIG. 7, the payer terminal 300 may include an authentication processor 310, an electronic wallet 320, a recognizer 330, a communicator 340, a display 350, and a controller 360. For reference, FIG. 7 shows only the elements related to the embodiment of the present disclosure. Therefore, those skilled in the art to which the present disclosure pertains will understand that other general-purpose elements may be provided in addition to the elements shown in FIG. 7. Further, the elements of the payment-service providing server shown in FIG. 7 indicate functional elements that are classified by function, and it will be appreciated that at least one element may be given in combination form in a real physical environment.

The elements are as follows. The authentication processor 310 provides various authentication functions required in performing the user-defined currency transaction. For example, the authentication processor 310 processes a user's electronic signature, which is input when the transaction service is requested, by interworking with the payment-service providing server 100. In addition, the authentication processor 310 may perform various kinds of authentication for the payer.

The electronic wallet 320 is an applied blockchain that stores a payer's own user-defined currency and/or virtual currency, and provides the blockchain-based payment service to a user while interworking with the blockchain system 200 and/or the payment-service providing server 100.

The recognizer 330 recognizes gestures of a payer based on a signal from a sensor provided in the payer terminal 300. For example, the controller 360 may execute control so that the electronic signature is made or the identification information is transmitted when a specific gesture is recognized by the recognizer 330. In this regard, a description thereof will be made below with reference to FIG. 8.

Further, the recognizer 330 may recognize a bar code, a QR code, etc.

The communicator 340 performs data communication with other elements of the blockchain-based payment processing system. To this end, the communicator 340 may include a wired Internet module, a mobile communication module, or a wireless communication module for exchanging data with the computing device as described above.

The display 350 displays a transaction progress status, a barcode or quick response (QR) code used in payment, etc. To this end, the display 350 may be configured to include a monitor, a touch screen, and like output devices.

The controller 360 controls general operations of the elements of the payer terminal 300. The controller 360 may be configured to include a CPU, an MPU, an MCU, or any processor well-known in the technical field of the present disclosure. Further, the controller 360 may perform an operation for at least one application or program to implement the method according to the foregoing exemplary embodiments of the present disclosure.

Additionally, although it is not illustrated in FIG. 7, the payer terminal 300 may be configured to further include an input part (not shown) and a storage (not shown).

The input part (not shown) receives various kinds of input from a payer so that the payment service may be performed. To this end, the input part (not shown) may be configured to include a keyboard, a mouse, a touch screen, and like input devices.

The storage (not shown) may non-temporarily store one or more computer programs for performing various operations of the payer terminal 300, membership information, authentication information, etc. The storage (not shown) may include a nonvolatile memory such as a ROM, an EPROM, an EEPROM, a flash memory, etc., a hard disk drive, a detachable disk drive, or any computer-readable recording medium well-known in the technical field of the present disclosure.

For reference, the seller terminal 400 may also be implemented using a configuration similar to that of the payer terminal 300. However, the seller terminal 400 may be configured to include or exclude some elements as necessary.

The elements of FIG. 7 may mean software, or mean hardware such as a FPGA or an ASIC. However, the elements are not limited to software or hardware, but may be configured to be in a storage medium capable of addressing or running one or more processors. The functions provided in the foregoing elements may be achieved with more subdivided elements, and may be achieved by one element in which a plurality of elements are combined to perform a specific function.

Hitherto, the payer terminal 300 has been described as one element of the blockchain-based payment processing system with reference to FIG. 7. Next, the blockchain-based payment processing method according to exemplary embodiments of the present disclosure will be described in detail with reference to FIGS. 8 to 12.

Below, the operations of the blockchain-based payment processing method according to an exemplary embodiment of the present disclosure may be implemented by the computing device. For example, the computing device may be the payment service providing server 100 or another element of the blockchain-based payment processing system according to the exemplary embodiment of the present disclosure. However, for convenience of description, a main agent of each operation involved in the blockchain-based payment processing method may not be omitted from description. Further, each operation of the blockchain-based payment processing method may be an operation performed in the payment service providing server 100 as the blockchain-based payment processing software 109a is executed by the processor 101.

Figure 8:
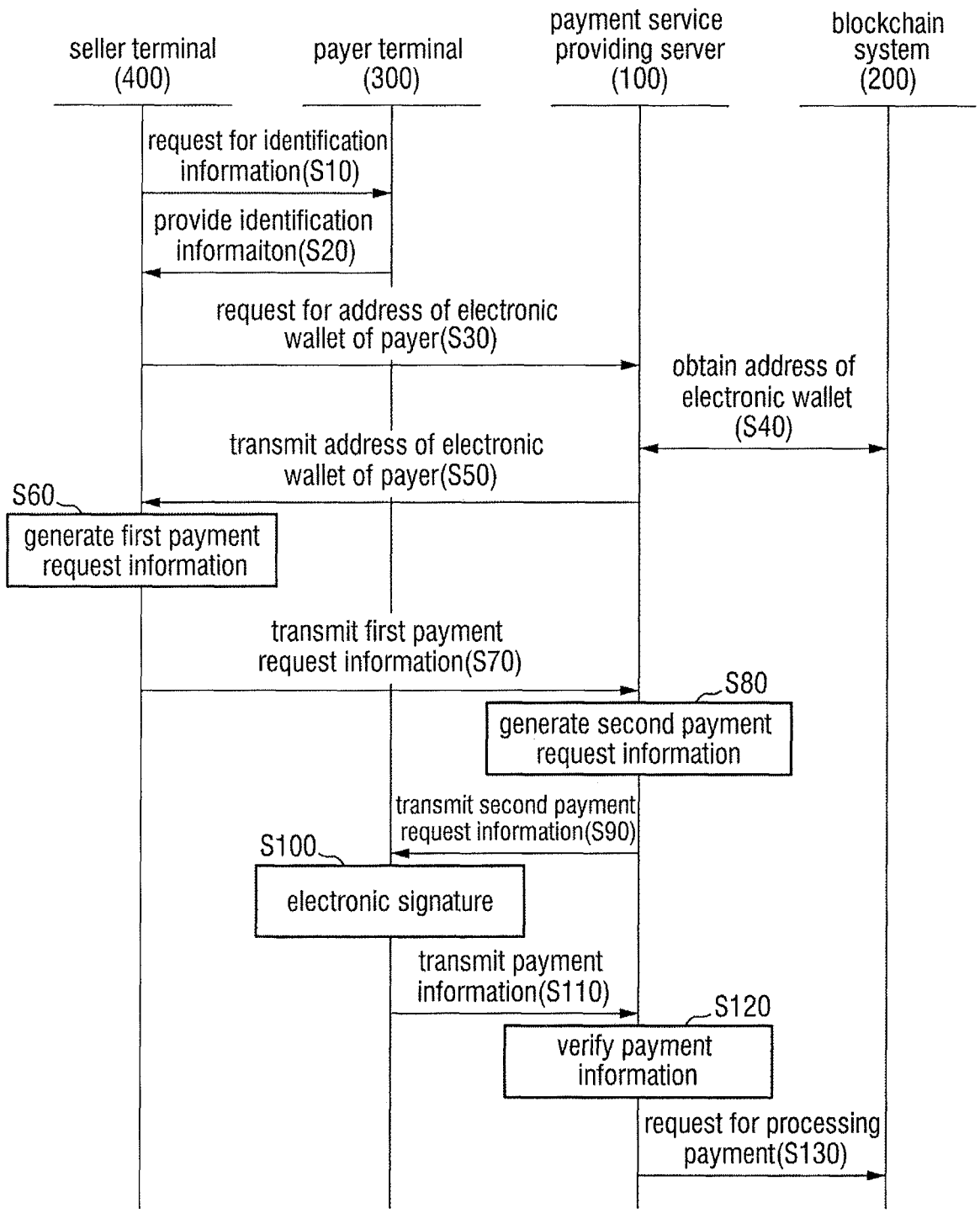
FIG. 8 is a flowchart of a blockchain-based payment processing method according to another embodiment of the present disclosure.

FIG. 8 is a flowchart of the blockchain-based payment processing method. However, this is merely an exemplary embodiment for realizing the present disclosure, and it will be appreciated that some operations may be included or excluded as necessary.

Referring to FIG. 8, the seller terminal 400 makes a request for identification information of a payer to the payer terminal 300 (S10), and the payer terminal 300 provides the identification information to the seller terminal 400 in response to the request for the identification information (S20). The identification information refers to information used for obtaining the electronic wallet address of the payer through the blockchain system 200, which may, for example, include a mobile phone number, the ID and name of the blockchain system 200, device information of the payer terminal 300, etc. without limitations. That is, according to an exemplary embodiment, the identification information may be variously defined in any way.

In one exemplary embodiment, a push notification together with the request for the identification information may be provided to the payer terminal 300. Further, the push notification may include a deep link to a specific page related to the request for the identification information. For example, the deep link may be a deep link to a page that shows information related to the request for the identification information in the electronic wallet application installed in the payer terminal 300, a deep link of a page that includes a function of providing the identification information, or the like. Further, the information related to the request for the identification information may include information about a seller such as a shop name or the like; purchase items, purchase amounts, etc. without limitations. According to the exemplary embodiment, the payer checks the request for the identification information in response to the push notification displayed on the payer terminal 300, and quickly provides the identification information on a page linked by the deep link, thereby improving user convenience.

In one exemplary embodiment, the payer terminal 300 may provide the identification information to the seller terminal 400 using a near field communication (NFC) tag, Bluetooth, beacon, or a like method. For example, when the request for the identification information is checked using the push notification, NFC tagging by the payer, or Bluetooth communication or a beacon device provided in a shop makes the identification information of the payer be automatically provided to the seller terminal 400 without any separate user input. Thus, it is more convenient for a user to use the payment service.

In one exemplary embodiment, the payer terminal 300 may recognize a gesture (hereinafter, referred to as a "first gesture") of a payer, and provide the identification information to the seller terminal 400 in response to the recognition of the first gesture. To provide the identification information to the seller terminal 400, Bluetooth or the like device-to-device (D2D) communication may be used. However, any method may be used. Here, the first gesture may be a gesture preset by the payer, and may include any gesture. According to an exemplary embodiment, to improve security, the payer terminal 300 may periodically change the first gesture into one gesture among a plurality of gestures registered by the payer, and inform the payer of the change.

Next, when the identification information of the payer is provided, the seller terminal 400 obtains the electronic wallet address of the payer through the payment service providing server 100 (S30, S40, and S50). Specifically, when the seller terminal 400 transmits the identification information of the payer to the payment service providing server 100 and makes a request for the electronic wallet address of the payer (S30), the payment service providing server 100 obtains the electronic wallet address of the payer from the blockchain system 200 on the basis of the identification information (S40), and transmits the obtained electronic wallet address to the seller terminal 400 (S50).

For reference, in operation S40, the payment service providing server 100 may perform validity verification with regard to the electronic wallet address of the payer through the blockchain system 200. For example, the validity verification may be performed with regard to whether there is an address for the electronic wallet of the payer, whether the address is valid, whether the amount of electronic currency is sufficient, etc.

When operation S50 is done, the seller terminal 400 can collect all pieces of essential information needed for generating the payment transaction. Specifically, since the payment amount of the purchase items and the electronic wallet address of the seller are already known to the seller, all pieces of essential information needed for the payment transaction are collected when the electronic wallet address of the payer is obtained in operation S50.

Then, the seller terminal 400 generates payment request information (hereinafter, referred to as "first payment request information") including the rest of the essential information (S60), and transmits the first payment request information to the payment service providing server 100 (S70).

In response to the received first payment request information, the payment service providing server 100 generates formatted payment request information (hereinafter, referred to as "second payment request information"), and transmits it to the payer terminal 300 (S80 and S90). Here, the second payment request information refers to information formatted based on the first payment request information so as to be processable by the blockchain system 200 or readable by the electronic wallet application installed in the payer terminal 300.

Figure 9:
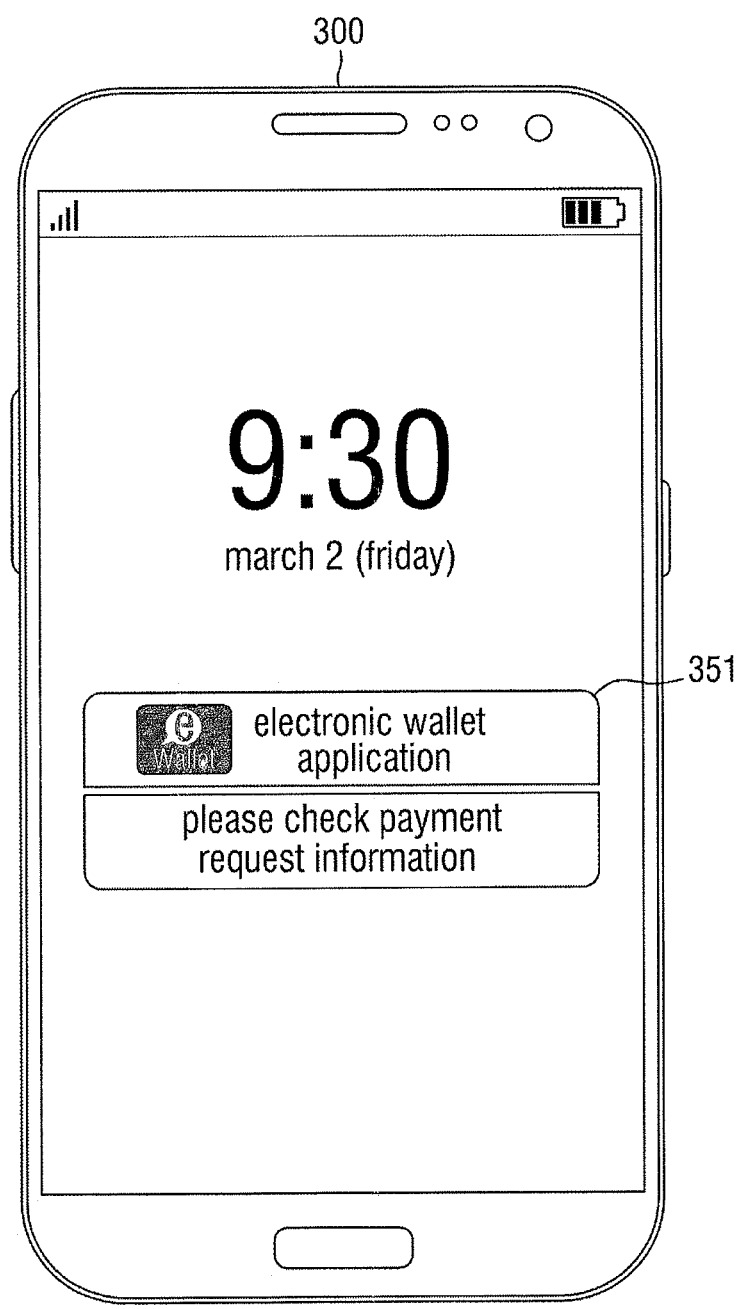
FIGS. 9 and 10 illustrate user interfaces of a payer terminal to be referred to in some exemplary embodiments of the present disclosure.
Figure 10:
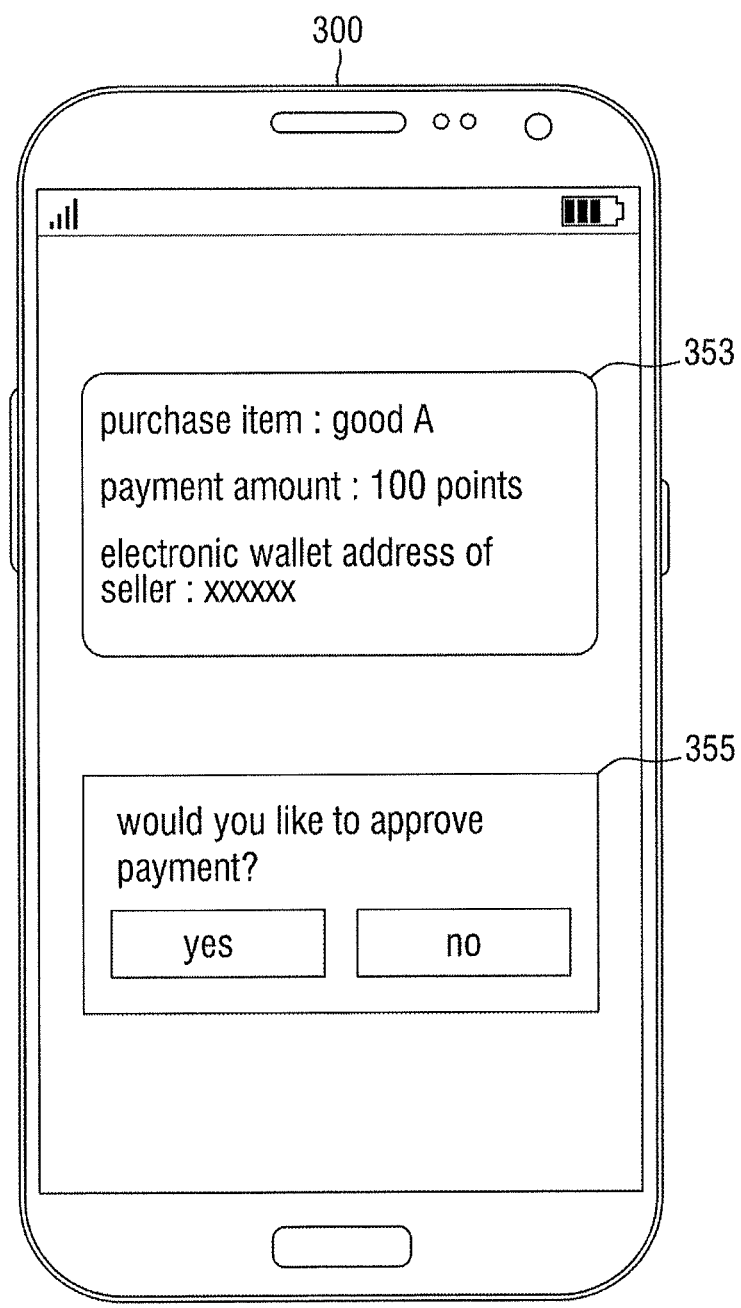

In one exemplary embodiment, the second payment request information may be provided together with a push notification involving a deep link to a specific page of the electronic wallet application installed in the payer terminal 300. For example, as shown in FIG. 9, a push notification 351 about the payment request may be provided to the payer terminal 300. Here, the specific page may include a page that shows the second payment request information in the electronic wallet application, or a page that is configured to receive an electronic signature for the payment request information. For example, as shown in FIG. 10, the specific page may be a page that includes a first GUI 3532 that shows payment request information such as purchase items, payment amounts, an electronic wallet address of a seller, etc., and shows a second GUI 355 related to a request for payment authorization along with the first GUI 353. According to the exemplary embodiment, the payment can be quickly authorized through a deep link, and user convenience is improved.

Referring back to FIG. 8, the payer terminal 300 receives the electronic signature for the payment request information from the payer (S100).

In one exemplary embodiment, the payer terminal 300 may operate to automatically make the electronic signature of the payer when recognizing a gesture (hereinafter, referred to as a "second gesture") of the payer. The second gesture may be a gesture previously set to trigger the electronic signature of the payer. According to an exemplary embodiment, the second gesture may be set to be different from the first gesture to improve security. Further, the second gesture may also be periodically changed into one gesture among a plurality of preset gestures, and the payer may be informed of the change.

Next, the payer terminal 300 transmits payment information added with the electronic signature to the payment service providing server 100 in response to the second payment request information. In response to the received payment information, the payment service providing server 100 verifies the validity of the payment information (S120), and the payment transaction based on the payment information is processed by the blockchain system 200 when the payment information is valid (S130).

Figure 11:
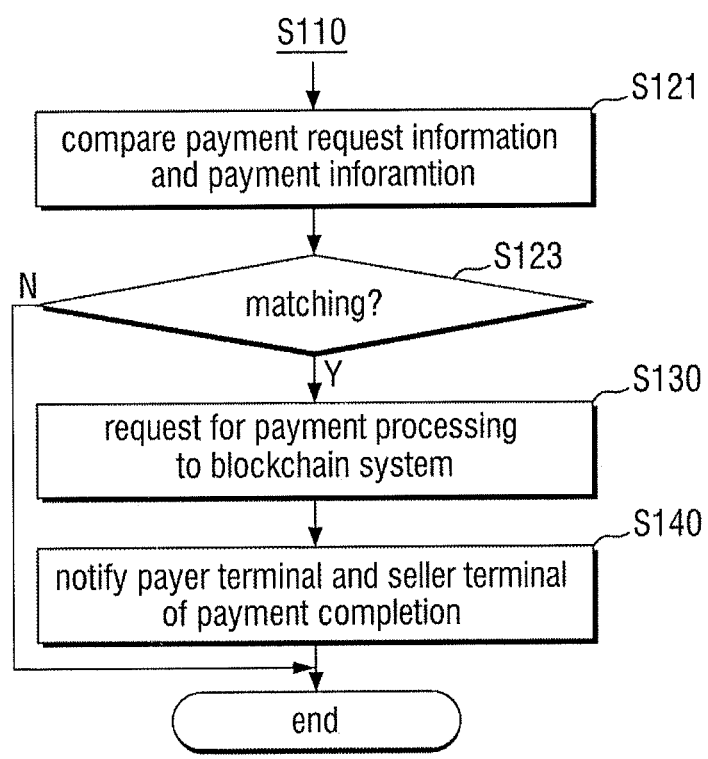
FIG. 11 is a detailed flowchart of a payment information verification operation (S120) shown in FIG. 8.

Specifically, in operation S120, the validity verification may be performed by comparing the second payment request information and the payment information. For example, as shown in FIG. 11, information matching may be verified with regard to the electronic wallet address of the payer, the electronic wallet address of the seller, the payment amount, etc. (S121 and S123). Further, the request for the payment process may be made to the blockchain system 200 only when information matching between the payer and the seller is verified (S123 and S130). With this, it can be ensured that the payment amount requested by the seller terminal 400 is accurately processed through the payment transaction.

Figure 12:
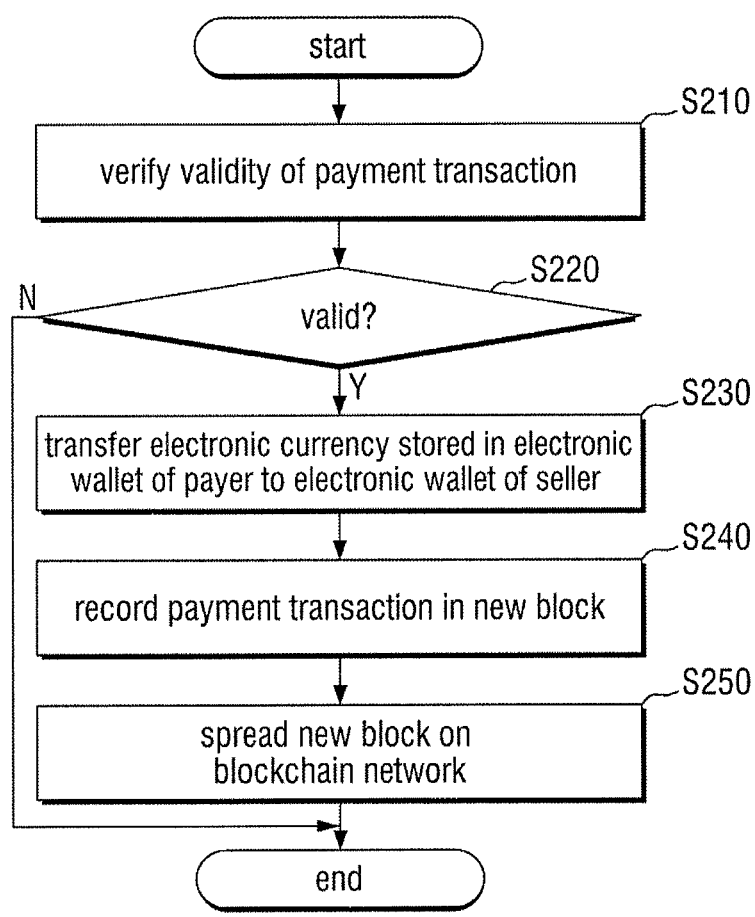
FIG. 12 is a flowchart for describing a procedure of processing a payment transaction in a blockchain system (200) according to an embodiment of the present disclosure.

Meanwhile, the payment transaction performed in the blockchain system 200 is processed by operations shown in FIG. 12.

Referring to FIG. 12, the blockchain system 200 first verifies the validity of the payment transaction (S210). It may be, for example, understood that this operation corresponds to verification of unspent transaction output (UTXO) performed in the Bitcoin system.

When the payment transaction is valid, the blockchain system 200 transfers the electronic currency stored in the electronic wallet of the payer to the electronic wallet of the seller (S230), records the payment transaction in a new block (S240), and spreads the new block to the blockchain network, thereby completing the process of the payment transaction.

Hitherto, the blockchain-based payment processing method according to the embodiment of the present disclosure has been described with reference to FIGS. 8 to 12. In the foregoing method, the payer can check the payment request information through the payer terminal 300 and pay for purchase items by making only the electronic signature, without another input. Thus, it is possible to not only provide a safe payment service through the blockchain-based payment service, but also greatly improve user convenience.

Next, an instant transaction processing method according to an exemplary embodiment of the present disclosure will be described with reference to FIG. 13.

As described above, the blockchain system 200 may be established with a permission-based blockchain network. When the permission-based blockchain network is established, a request for processing a payment transaction is made by only a permitted blockchain node and a permitted service user, and an instant transaction is processed based on such reliability. Below, a procedure of processing the instant transaction will be described in detail with reference to FIG. 13. For reference, the payment service providing server 100 is not illustrated in FIG. 13 for convenience of description, but it will be appreciated that the operations previous to operation S310 of making the request for the payment transaction are performed according to the flowchart shown in FIG. 8.

Figure 13:
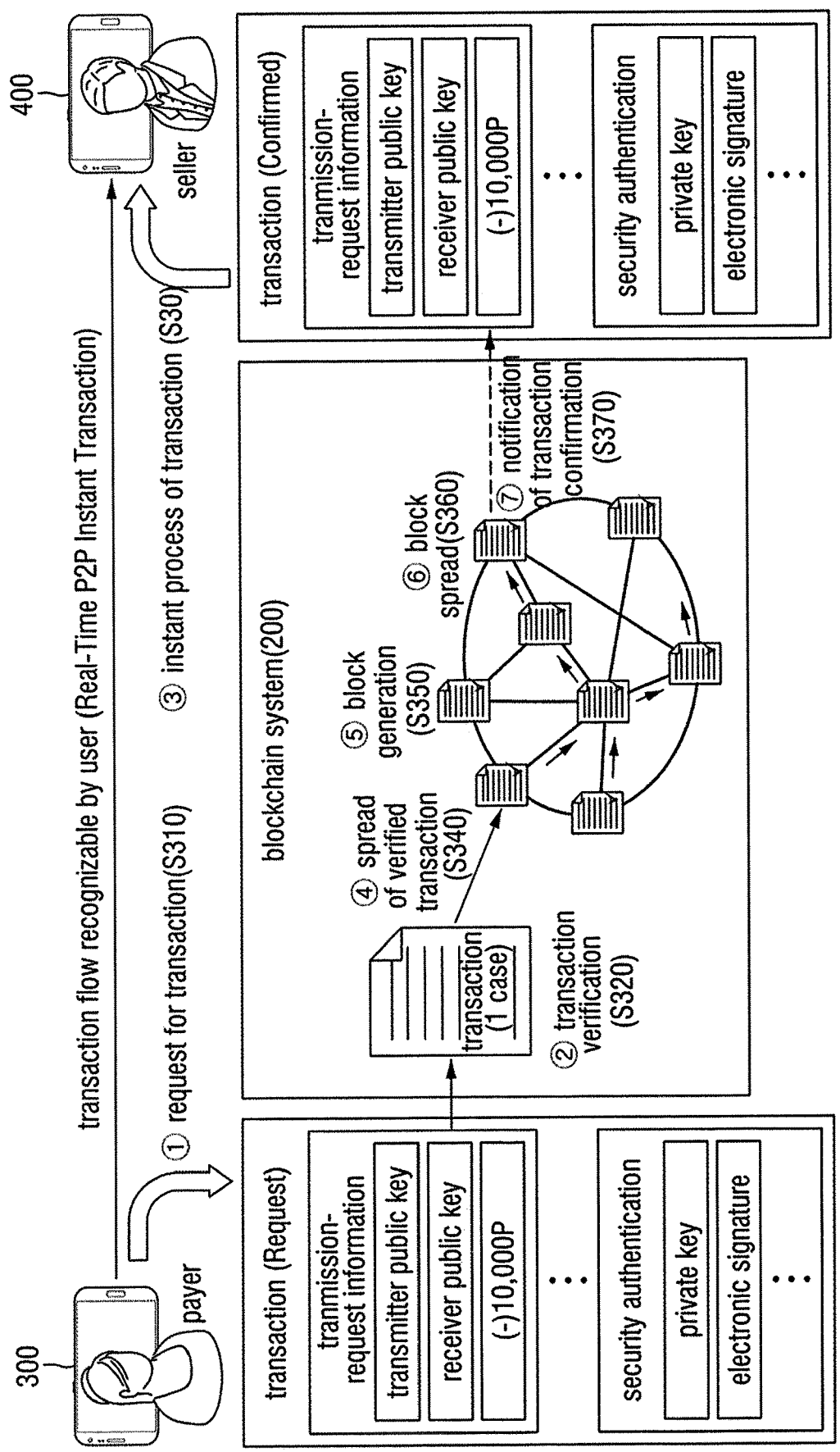
FIG. 13 is a view for describing a method of processing an instant transaction to be performed in the blockchain system (200) according to an embodiment of the present disclosure.

Referring to FIG. 13, when the blockchain system 200 receives the request for processing the payment transaction (S310), the validity of the payment transaction is verified in response to the processing request (S320). The verification of the validity may, for example, include verification of whether the payer is permitted, verification of a possessed electronic currency amount, etc. As a result of verification, when the payment transaction is valid, the electronic currency is instantly transferred to the electronic wallet of the seller in accordance with the payment transaction, and the seller terminal 400 is informed of the payment transaction processing completion (S330). That is, the blockchain system 200 may instantly process the payment transaction before the payment transaction is recorded and confirmed in a new block.

According to an exemplary embodiment, the payer terminal 300 and/or the seller terminal 400 may be notified of a payment transaction completion message based on the reliability of the permission-based blockchain network even before the validity of the payment transaction is verified. For example, when permission for a payer satisfies a preset condition (e.g., a user having a high permission), the payment transaction requested by the payer may be instantly processed even before the validity verification is performed.

For reference, a payment transaction verified as valid may be recorded in a temporary pool. The temporary pool is regarded as a place where the payment transaction is temporarily stored before being recoded in a new block. This is obvious to those skilled in the art, and detailed descriptions thereof will be omitted. Further, descriptions of subsequent operations S340 to S370 are omitted to avoid repetitive description.

Hitherto, the instant transaction processing method according to the exemplary embodiment of the present disclosure has been described with reference to FIG. 13. In the foregoing instant transaction processing method, the payment transaction is processible even before the payment transaction is recorded in a specific block on the blockchain data. Thus, the transaction process is greatly improved in response speed, and satisfaction of a user using the blockchain-based payment service is improved.

According to the foregoing present disclosure, an electronic wallet address of a payer received from a payment service providing server is used to generate payment request information in a seller terminal. Further, the payer checks the payment request information through the payer terminal, and then pays for purchase items by making only an electronic signature, without another input. Thus, it is possible to not only provide a safe payment service through a blockchain-based payment service but also greatly improve user convenience.

Further, there is no need for a payer's direct input in providing identification information of a payer to a seller terminal or providing payer's electronic signature information to a payment service providing server. For example, the identification information may be provided through a NFC tag, Bluetooth, a beacon, gesture recognition, etc., and the electronic signature information can also be provided through the gesture recognition. Thus, it is possible to improve convenience of a user using the blockchain-based payment service, and enhance service satisfaction.

Further, a payment service can be processed at high speed by push notification including a deep link, and by an instant transaction process. Therefore, user service satisfaction in using a blockchain-based payment service is improved.

The effects of the present disclosure are not limited to the foregoing effects, and other effects not mentioned above will also be clearly understood by those skilled in the art from the foregoing detailed descriptions.

The concepts of the disclosure described above with reference to FIGS. 4 to 13 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A method of processing payment based on a blockchain, which is performed by a payment service providing server, the method comprising:
receiving a request from a terminal of a seller for an electronic wallet address of a payer, the request comprising identification information of the payer;
obtaining the electronic wallet address of the payer based on the identification information of the payer through a blockchain system, in response to the receiving the request for the electronic wallet address;
transmitting the obtained electronic wallet address of the payer to the terminal of the seller;
receiving first payment request information from the terminal of the seller, the first payment request information comprising the obtained electronic wallet address of the payer;
generating a second payment request information based on the first payment request information, the second payment request information being configured to be displayed in an electronic wallet application installed in a terminal of the payer;
transmitting the second payment request information to a terminal of the payer;
receiving payment information from the terminal of the payer, the payment information comprising an electronic signature of the payer;
comparing the second payment request information and the payment information; and
based on a match between the second payment request information and the payment information, processing a payment transaction through the blockchain system,
wherein the transmitting of the second payment request information to the terminal of the payer comprises providing a push notification with a link to a specific page of the electronic wallet application installed in the terminal of the payer, together with the second payment request information,
wherein the specific page comprises at least one of a page for showing the second payment request information and a page for receiving the electronic signature of the payer for the second payment request information.

2. The method of claim 1, wherein the first payment request information further comprises an electronic wallet address of the seller and a payment amount.

3. The method of claim 1, further comprising:
wherein the processing of the payment transaction comprises processing the payment transaction in response to the determining that the second payment request information matches the payment information.

4. The method of claim 1, wherein the identification information of the payer is obtained from the terminal of the payer through one of a near field communication (NFC) tag, Bluetooth, and a beacon.

5. The method of claim 1, wherein:
the identification information is automatically provided from the terminal of the payer to the terminal of the seller in response to the terminal of the payer recognizing a first gesture of the payer;
the electronic signature of the payer is automatically added by the terminal of the payer in response to the terminal of the payer recognizing a second gesture of the payer; and
the first gesture and the second gesture are different from each other.

6. The method of claim 1, wherein the processing of the payment transaction based on the payment information comprises:
making a request for processing the payment transaction to the blockchain system;
transferring, by the blockchain system, an electronic currency stored in the electronic wallet of the payer to the electronic wallet of the seller in response to the request for the processing; and
recording, by the blockchain system, the payment transaction in blockchain data to be managed by each blockchain node included in the blockchain system.

7. The method of claim 6, wherein the electronic currency comprises a user-defined currency defined by an open asset protocol.

8. The method of claim 1, wherein:
the blockchain system is established with a permission-based blockchain network in which a permitted blockchain node participates; and
the processing of the payment transaction based on the payment information comprises:
a first operation of making a request for processing the payment transaction to the blockchain system;
a second operation of transferring, by the blockchain system, an electronic currency stored in the electronic wallet of the payer to the electronic wallet of the seller in response to the request for the processing;
a third operation of making the terminal of the seller be notified of a payment completion message of the payment transaction; and
a fourth operation of recording, by the blockchain system, the payment transaction in blockchain data to be managed by each blockchain node included in the blockchain system,
wherein the first to fourth operations are performed in sequence.

9. The method of claim 8, further comprising verifying, by the blockchain system, validity of the payment transaction,
wherein the second to fourth operations are performed in response to a determination indicating that the payment transaction is valid.

10. A server for providing a payment service, the server comprising:
a hardware processor; and
a memory configured to load a computer program executed by the hardware processor;
wherein the computer program which, when executed by the hardware processor, causes the hardware processor to perform operations comprising:
receiving a request from a terminal of a seller for an electronic wallet address of a payer, the request comprising identification information of the payer;
obtaining the electronic wallet address of the payer based on the identification information of the payer through a blockchain system, in response to the receiving the request for the electronic wallet address;
transmitting the obtained electronic wallet address of the payer to the terminal of the seller;
receiving first payment request information from the terminal of the seller, the first payment request information comprising the obtained electronic wallet address of the payer;
generating a second payment request information based on the first payment request information, the second payment request information being configured to be displayed in an electronic wallet application installed in a terminal of the payer;

transmitting the second payment request information to a terminal of the payer;

receiving payment information from the terminal of the payer, the payment information comprising an electronic signature of the payer;

comparing the second payment request information and the payment information; and based on a match between the second payment request information and the payment information, processing a payment transaction through the blockchain system, wherein the transmitting of the second payment request information to the terminal of the payer comprises providing a push notification with a link to a specific page of the electronic wallet application installed in the terminal of the payer, together with the second payment request information, wherein the specific page comprises at least one of a page for showing the second payment request information and a page for receiving the electronic signature of the payer for the second payment request information.

11. The server of claim 10, wherein the first payment request information further comprises an electronic wallet address of the seller and a payment amount.

12. The server of claim 10, wherein the processing the payment transaction comprises processing the payment transaction in response to a determining that the second payment request information matches the payment information.

13. The server of claim 10, wherein the identification information of the payer is obtained from the terminal of the payer through one of a near field communication (NFC) tag, Bluetooth, and a beacon.

14. The server of claim 10, wherein the processing the payment transaction based on the payment information comprises:

making a request for processing the payment transaction to the blockchain system;

transferring, by the blockchain system, an electronic currency stored in the electronic wallet of the payer to the electronic wallet of the seller in response to the request for the processing; and recording, by the blockchain system, the payment transaction in blockchain data to be managed by each blockchain node included in the blockchain system.

15. The server of claim 14, wherein the electronic currency comprises a user-defined currency defined by an open asset protocol.

16. The server of claim 10, wherein the blockchain system is established with a permission-based blockchain network in which a permitted blockchain node participates, and wherein the processing the payment transaction based on the payment information comprises:

a first operation of making a request for processing the payment transaction to the blockchain system;

a second operation of transferring, by the blockchain system, an electronic currency stored in the electronic wallet of the payer to the electronic wallet of the seller in response to the request for the processing;

a third operation of making the terminal of the seller be notified of a payment completion message of the payment transaction; and a fourth operation of recording, by the blockchain system, the payment transaction in blockchain data to be managed by each blockchain node included in the blockchain system, wherein the first to fourth operations are performed in sequence.

17. A system comprising a server for providing a payment service, the server comprising:

a hardware processor; and a memory configured to load a computer program executed by the hardware processor;

wherein the computer program which, when executed by the hardware processor, causes the hardware processor to perform operations comprising:

receiving a request from a terminal of a seller for an electronic wallet address of a payer, the request comprising identification information of the payer;

obtaining the electronic wallet address of the payer based on the identification information of the payer through a blockchain system, in response to the receiving the request for the electronic wallet address;

transmitting the obtained electronic wallet address of the payer to the terminal of the seller;

receiving first payment request information from the terminal of the seller, the first payment request information comprising the obtained electronic wallet address of the payer;

generating a second payment request information based on the first payment request information, the second payment request information being configured to be displayed in an electronic wallet application installed in a terminal of the payer;

transmitting the second payment request information to a terminal of the payer;

receiving payment information from the terminal of the payer, the payment information comprising an electronic signature of the payer;

comparing the second payment request information and the payment information; and based on a match between the second payment request information and the payment information, processing a payment transaction through the blockchain system, wherein the transmitting of the second payment request information to the terminal of the payer comprises providing a push notification with a link to a specific page of the electronic wallet application installed in the terminal of the payer, together with the second payment request information, wherein the specific page comprises at least one of a page for showing the second payment request information and a page for receiving the electronic signature of the payer for the second payment request information.

18. The server of claim 17, wherein the generating the second payment request information comprises:

formatting the first payment request information to be readable by an electronic wallet application; and combining the formatted first payment request information and a push notification with a link to a specific page of the electronic wallet application;

wherein the specific page comprises a least one of a first page for showing the second payment request information and second a page for receiving the electronic signature of the second user.

* * * * *